US010838422B2

(12) United States Patent
Fujimura et al.

(10) Patent No.: US 10,838,422 B2
(45) Date of Patent: Nov. 17, 2020

(54) INFORMATION PROCESSING METHOD AND INFORMATION PROCESSING APPARATUS

(71) Applicant: Panasonic Intellectual Property Corporation of America, Torrance, CA (US)

(72) Inventors: Ryota Fujimura, Kanagawa (JP); Tetsuji Fuchikami, Osaka (JP); Hiroaki Urabe, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/925,727

(22) Filed: Mar. 19, 2018

(65) Prior Publication Data
US 2018/0299896 A1    Oct. 18, 2018

(30) Foreign Application Priority Data

Apr. 13, 2017   (JP) .................................. 2017-079762
Nov. 21, 2017   (JP) .................................. 2017-223703

(51) Int. Cl.
*G05D 1/02*       (2020.01)
*G01C 21/32*      (2006.01)
(Continued)

(52) U.S. Cl.
CPC ........... *G05D 1/0214* (2013.01); *B60W 30/00* (2013.01); *G01C 21/32* (2013.01);
(Continued)

(58) Field of Classification Search
CPC .. G05D 1/0214; G05D 1/0088; G05D 1/0221; G05D 1/0246; G01C 21/32; G01C 21/3461; G01C 21/3602; B60W 30/00
See application file for complete search history.

(56) References Cited

U.S. PATENT DOCUMENTS

| 5,612,883 | A  | * | 3/1997 | Shaffer ............. | B60K 31/0008 340/435 |
| 6,256,579 | B1 | * | 7/2001 | Tanimoto ........... | G01C 21/3484 701/424 |
| 6,396,395 | B1 | * | 5/2002 | Zielinski ............ | B60Q 1/50 180/271 |

(Continued)

FOREIGN PATENT DOCUMENTS

| WO | 2016/063384 | 4/2016 |
| WO | 2016/063385 | 4/2016 |

OTHER PUBLICATIONS

The Extended European Search Report dated Sep. 12, 2018 for European Patent Application No. 18164149.9.

*Primary Examiner* — Behrang Badii
*Assistant Examiner* — Daniel L Greene
(74) *Attorney, Agent, or Firm* — Greenblum & Bernstein, P.L.C.

(57) ABSTRACT

An information processing method includes acquiring, from a device mounted on a vehicle, manual driving information indicating vehicle control for manual driving through a driving route section of the vehicle, acquiring from a device mounted on a vehicle, sensor information acquired via sensing on the vehicle through the driving route section. The information processing method further includes generating automated driving information indicating vehicle control for automated driving through the driving route section, based on the sensor information, and generating automated driving possibility information indicating a possibility of the automated driving through the driving route section, based on the manual driving information and the automated driving information.

19 Claims, 7 Drawing Sheets

(51) Int. Cl.
  *B60W 30/00*  (2006.01)
  *G01C 21/34*  (2006.01)
  *G01C 21/36*  (2006.01)
  *G05D 1/00*  (2006.01)

(52) U.S. Cl.
  CPC ..... *G01C 21/3461* (2013.01); *G01C 21/3602* (2013.01); *G05D 1/0088* (2013.01); *G05D 1/0221* (2013.01); *G05D 1/0246* (2013.01); *G05D 2201/0213* (2013.01)

(56) References Cited

U.S. PATENT DOCUMENTS

| | | | | |
|---|---|---|---|---|
| 8,593,521 B2 * | 11/2013 | Schofield | ........... | G06K 9/00818 348/148 |
| 2007/0198145 A1 * | 8/2007 | Norris | ........ | B60T 7/22 701/23 |
| 2011/0068954 A1 * | 3/2011 | McQuade | ........ | G08G 1/20 340/988 |
| 2011/0190972 A1 * | 8/2011 | Timmons | ........ | G01C 21/34 701/31.4 |
| 2012/0095640 A1 * | 4/2012 | Lehtinen | ........ | E02F 3/434 701/25 |
| 2013/0211656 A1 * | 8/2013 | An | ........ | G05D 1/0221 701/25 |
| 2013/0302756 A1 * | 11/2013 | Takeuchi | ........ | G09B 9/042 434/64 |
| 2014/0156133 A1 * | 6/2014 | Cullinane | ........ | B60K 35/00 701/23 |
| 2014/0303827 A1 * | 10/2014 | Dolgov | ........ | B60W 50/10 701/23 |
| 2014/0307247 A1 * | 10/2014 | Zhu | ........ | G01S 17/023 356/4.01 |
| 2015/0314780 A1 | 11/2015 | Stenneth et al. | | |
| 2016/0001781 A1 * | 1/2016 | Fung | ........ | B60W 40/08 701/36 |
| 2016/0167652 A1 | 6/2016 | Slusar | | |
| 2016/0207538 A1 | 7/2016 | Urano et al. | | |
| 2017/0314943 A1 | 11/2017 | Fujita | | |
| 2017/0322557 A1 | 11/2017 | Fujita | | |

* cited by examiner

FIG. 3

| ALGORITHM | FRAME RATE | SENSOR IN USE | TYPE OF AUTOMATED DRIVING |
|---|---|---|---|
| LARGE-SCALE DL (HIGH PRECISION AND LOW VELOCITY) | 60 fps | CAMERA ONLY | FULLY AUTOMATED DRIVING |
| SMALL-SCALE DL (LOW PRECISION AND HIGH VELOCITY) | 30 fps | CAMERA + LIDAR | PARTIALLY AUTOMATED DRIVING |
| DL + RULE | 10 fps | CAMERA + LIDAR + GNSS | |

FIG. 4

| ALGORITHM | FRAME RATE | SENSOR IN USE | FULLY AUTOMATED | PARTIALLY AUTOMATED | COMPUTATIONAL PERFORMANCE | AUTOMATED DRIVING DETERMINATION (OWN VEHICLE) |
|---|---|---|---|---|---|---|
| LARGE-SCALE DL | 60 fps | CAMERA ONLY | YES | YES | INSUFFICIENT | DENIED |
| LARGE-SCALE DL | 30 fps | CAMERA ONLY | YES | YES | INSUFFICIENT | DENIED |
| LARGE-SCALE DL | 10 fps | CAMERA ONLY | NO | YES | SUFFICIENT | PARTIALLY GRANTED |
| SMALL-SCALE DL | 60 fps | CAMERA ONLY | YES | YES | INSUFFICIENT | DENIED |
| SMALL-SCALE DL | 30 fps | CAMERA ONLY | NO | NO | SUFFICIENT | DENIED |
| SMALL-SCALE DL | 10 fps | CAMERA ONLY | NO | NO | SUFFICIENT | DENIED |
| DL + RULE | 60 fps | CAMERA ONLY | YES | YES | INSUFFICIENT | DENIED |
| DL + RULE | 30 fps | CAMERA ONLY | YES | YES | SUFFICIENT | GRANTED |
| DL + RULE | 10 fps | CAMERA ONLY | NO | NO | SUFFICIENT | DENIED |
| ... | ... | ... | ... | ... | ... | ... |

114

| TIME STAMP | MANUAL LOG (60 fps) | SIMULATION (60 fps) | SIMULATION (10 fps) |
|---|---|---|---|
| 0:00:00:01 | 0 | 1 | 0 |
| 0:00:00:03 | 5 | 3 | |
| 0:00:00:04 | 3 | 4 | |
| 0:00:00:06 | 5 | 5 | |
| 0:00:00:08 | 7 | 2 | |
| 0:00:00:10 | 20 | 17 | 20 |
| 0:00:00:12 | 30 | 20 | |
| ... | ... | ... | ... |

INFORMATION PROCESSING METHOD AND INFORMATION PROCESSING APPARATUS

CROSS-REFERENCE TO RELATED APPLICATIONS

This application claims the benefit of Japanese Application No. 2017-223703, filed on Nov. 21, 2017 and Japanese Application No. 2017-079762, filed on Apr. 13, 2017, the entire disclosures of which Applications are incorporated by reference herein.

BACKGROUND

1. Technical Field

The present disclosure relates to an information processing method and an information processing apparatus.

2. Description of the Related Art

Techniques of determining in route searching of a vehicle whether automated driving is possible are disclosed. Reference is made to International Publication No. 2016/063385.

SUMMARY

One non-limiting and exemplary embodiment provides an information processing method and an information processing apparatus that determine more precisely whether automated driving is possible.

In one general aspect, the techniques disclosed here feature an information processing method. The information processing method includes acquiring, from a device mounted on a vehicle, manual driving information indicating vehicle control for manual driving through a driving route section of the vehicle, acquiring, from a device mounted on the vehicle, sensor information acquired via sensing on the vehicle through the driving route section, generating automated driving information indicating vehicle control for automated driving through the driving route section, based on the sensor information, and generating automated driving possibility information indicating a possibility of the automated driving through the driving route section, based on the manual driving information and the automated driving information.

The disclosure thus provides the information processing method and the information processing apparatus that determine more precisely whether automated driving is possible.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 illustrates an example of parameters of automated driving specifications of the first embodiment;

FIG. 4 illustrates an example of automated driving possibility information of the first embodiment;

DETAILED DESCRIPTION

Figure 1:
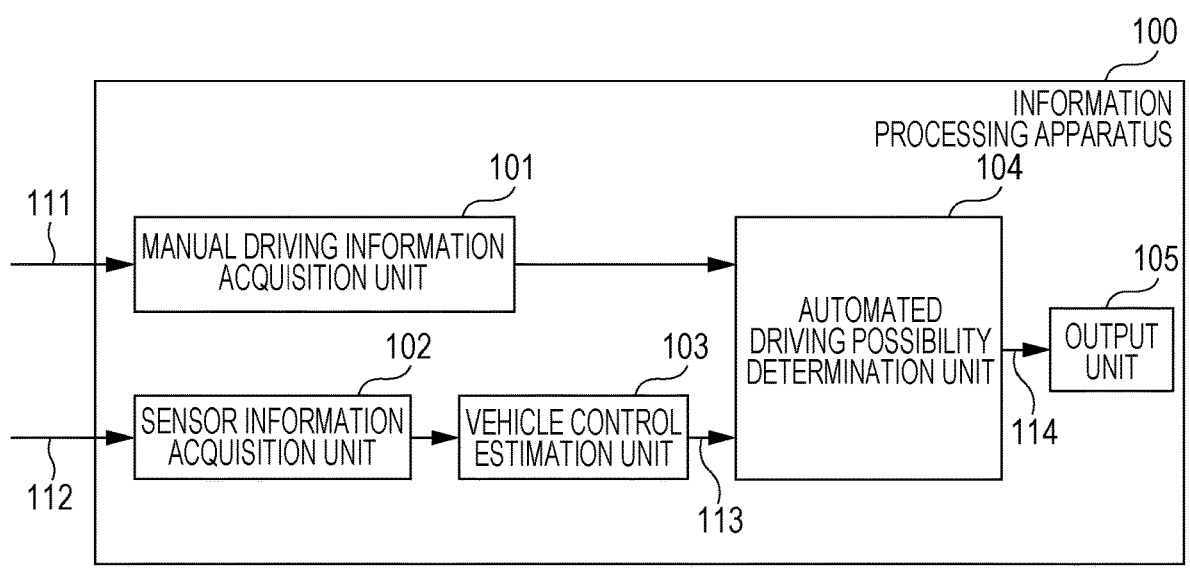
FIG. 1 is a block diagram of an information processing apparatus of a first embodiment.

According to an aspect of the present disclosure, there is provided an information processing method. The information processing method includes acquiring, from a device mounted on a vehicle, manual driving information indicating vehicle control for manual driving through a driving route section of the vehicle, acquiring, from a device mounted on the vehicle, sensor information acquired via sensing on the vehicle through the driving route section, generating automated driving information indicating vehicle control for automated driving through the driving route section, based on the sensor information, and generating automated driving possibility information indicating a possibility of the automated driving through the driving route section, based on the manual driving information and the automated driving information.

In that configuration, the information processing method determines the possibility of the automated driving, based on the vehicle control for the automated driving, and the vehicle control for the automated driving generated using the sensor information acquired via the sensing.

The generating of the automated driving information may include generating the automated driving information indicating the vehicle control for the automated driving responsive to a specification of the automated driving.

In that configuration, the information processing method determines the possibility of the automated driving in response to the automated driving specification.

The information processing method may further include acquiring, from an external apparatus including the device mounted on the vehicle or a memory in a computer, automated driving specification information indicating the specification of the automated driving of the vehicle. The generating of the automated driving information may include generating the automated driving information indicating the vehicle control for the automated driving responsive to the specification of the automated driving indicated by the automated driving specification information.

The generating of the automated driving information may include generating multiple pieces of automated driving information respectively indicating the vehicle control for the automated driving on each of multiple specifications of the automated driving. The generating of the automated driving possibility information may include generating multiple pieces of the automated driving possibility information on each of the specifications of the automated driving, based on the manual driving information and the pieces of the automated driving information.

In that configuration, the information processing method determines the possibility of the automated driving in response to the multiple specifications of the automated driving.

The specification of the automated driving may include an algorithm for the automated driving.

In that configuration, the information processing method determines the possibility of the automated driving in accordance with the algorithm of the automated driving.

The specification of the automated driving may include a processing rate of the automated driving.

In that configuration, the information processing method determines the possibility of the automated driving in accordance with the processing rate of the automated driving.

The specification of the automated driving may include a type of a sensor for use in the automated driving.

In that configuration, the information processing method determines the possibility of the automated driving in response to the type of the sensor in use.

The specification of the automated driving may include a level or contents of the automated driving.

In that configuration, the information processing method determines the possibility of the automated driving in response to the level or contents of the automated driving.

The information processing method may further include acquiring, from an external apparatus including the device mounted on the vehicle or a memory in a computer, computational performance information indicating computational performance of the vehicle. The generating of the automated driving possibility information may include generating the automated driving possibility information, based on results of a determination that is performed in accordance with the computational performance indicated by the computational performance information and that indicates whether the automated driving is possible on the vehicle, and based on the manual driving information, and the automated driving information.

In that configuration, the information processing method determines whether the vehicle is able to perform the automated driving in each of the automated driving specifications.

The generating of the automated driving information may include generating the automated driving information, based on comparison results of the manual driving information with the automated driving information.

In that configuration, the information processing method determines the possibility of the automated driving, based on the manual driving information and the automated driving information.

Each piece of the manual driving information and the automated driving information may include a degree of the vehicle control. The generating of the automated driving possibility information may include generating the automated driving possibility information, based on a correlation between the degree of the vehicle control indicated by the manual driving information and the degree of the vehicle control indicated by the automated driving information.

In that configuration, the information processing method determines the possibility of the automated driving, based on the correlation between the manual driving information and the automated driving information.

The generating of the automated driving possibility information may include generating the automated driving possibility information, based a difference between a state of the vehicle responsive to the vehicle control indicated by the manual driving information and a state of the vehicle responsive to the vehicle control indicated by the automated driving information.

In that configuration, the information processing method determines the possibility of the automated driving, in accordance with the degree of the vehicle control based on the manual driving information and the automated driving information.

The state of the vehicle may include at least one of a position and a posture of the vehicle.

In that configuration, the information processing method determines the possibility of the automated driving, based on the position or the posture of the vehicle.

The information processing method may further include acquiring, from a device mounted on at least another vehicle different from the vehicle, at least a piece of manual driving information different from the manual driving information, and, based on the manual driving information and at least the piece of manual driving information, determining whether the manual driving information is valid. The generating of the automated driving possibility information may include generating the automated driving possibility information if the manual driving information is determined to be valid.

In that configuration, the information processing method excludes the manual driving information that is not valid, and controls an erroneous determination based on the manual driving information that is not valid.

According to another aspect of the disclosure, there is provided an information processing apparatus. The information processing apparatus include a manual driving information acquisition unit that acquires, from a device mounted on a vehicle, manual driving information indicating vehicle control for manual driving through a driving route section of the vehicle, a sensor information acquisition unit that acquires, from a device mounted on the vehicle, sensor information acquired via sensing on the vehicle through the driving route section, an automated driving information that generates automated driving information indicating vehicle control for automated driving through the driving route section, based on the sensor information, and an automated driving possibility determination unit that generates automated driving possibility information indicating a possibility of the automated driving through the driving route section, based on the manual driving information and the automated driving information.

In that configuration, the information processing apparatus determines the possibility of the automated driving, in accordance with the vehicle control for the manual driving, and the vehicle control for the automated driving generated using the sensor information acquired via the sensing. The information processing apparatus may thus determine more precisely the possibility of the automated driving.

These general or specific embodiments may be implemented as a system, a method, an integrated circuit, a computer program, a non-transitory computer readable recording medium such as CD-ROM, or any selective combination thereof.

Embodiments are specifically described with reference to the drawings. Each of the embodiments described below represents a general or specific example of the disclosure. Numerical values, shapes, materials, elements, a layout position and configuration of the elements, steps and the order of the steps in the embodiments are described for exemplary purposes only, and are not intended to limit the disclosure. Elements not described in independent claims indicative of a generic concept, from among the elements of the embodiments, may be any elements.

First Embodiment

An information processing method and information processing apparatus of a first embodiment determines the possibility of automated driving in accordance with vehicle control for manual driving, and vehicle control for automated driving estimated using sensor information acquired via sensing. The information processing method and information processing apparatus thus determine the possibility of the automated driving more precisely.

The configuration of an information processing apparatus 100 of the first embodiment is described below. FIG. 1 is a block diagram of the information processing apparatus 100 of the first embodiment. The information processing apparatus 100 of FIG. 1 may be mounted in a vehicle, or in a server that communicates with the vehicle. The information processing apparatus 100 does not necessarily have to be implemented as a unitary device in the vehicle or the server. Alternatively, the process of the information processing apparatus 100 may be performed in a distributed fashion by multiple devices. For example, some functionalities of the information processing apparatus 100 may be implemented in the vehicle and other functionalities may be implemented in the server.

The information processing apparatus 100 determines the possibility of the automated driving, using manual driving information 111 indicating the vehicle control for manual driving of the vehicle, and automated driving information 113 indicating vehicle control for automated driving estimated by sensor information 112 acquired via sensing. The information processing apparatus 100 includes a manual driving information acquisition unit 101, a sensor information acquisition unit 102, a vehicle control estimation unit 103, an automated possibility determination unit 104, and an output unit 105.

The manual driving information acquisition unit 101 acquired, for example, from the vehicle, the manual driving information 111 indicating the vehicle control for the automated driving of the vehicle. The vehicle control includes an operation on the vehicle by a driver (such as steering a wheel, depressing an accelerator pedal, depressing a brake pedal, or operating a blinker), and controlling a vehicle actuator in response to such a operation (for example, control of a steering angle of tires, accelerator opening, and brake pressure).

The sensor information acquisition unit 102 acquires the sensor information 112 via sensing on the vehicle. More specifically, the sensor information 112 is information acquired from a variety of sensors mounted on the vehicle. For example, the sensor information 112 includes (1) an image acquired via a camera (such as a still image or a moving image), (2) point group data acquired via laser imaging detection and ranging (Lidar), (3) position information (such as longitude and latitude) acquired via the global navigation satellite system (GNSS) like the global positioning system (GPS), (4) information acquired when the travel amount of own vehicle is estimated (such as tire rotation angle, cruising speed, position, or posture), (5) acceleration acquired by an accelerometer, (6) range image acquired by a millimeter-wave radar, (7) range image acquired by a time of flight (TOF) sensor, and (8) a distance to an obstacle acquired by an ultrasonic sensor.

Using the sensor information 112, the vehicle control estimation unit 103 estimates the vehicle control for the automated driving of the vehicle by simulating the automated driving. The vehicle control estimation unit 103 generates the automated driving information 113 indicating the estimated vehicle control for the automated driving.

Based on the manual driving information 111 and the automated driving information 113, the automated possibility determination unit 104 generates automated driving possibility information 114 indicating whether the automated driving is possible.

The output unit 105 outputs the automated driving possibility information 114. More specifically, the output unit 105 outputs the automated driving possibility information 114 to a map server that stores map information. The output unit 105 associates the automated driving possibility information 114 with the map information. For example, the output unit 105 adds the automated driving possibility information 114 to a section in the map information corresponding to the automated driving possibility information 114. Moreover, the output unit 105 may display the automated driving possibility information 114, may output the automated driving possibility information 114 in voice, or may output the automated driving possibility information 114 to another apparatus. Further, the output unit 105 may present, to a user of the vehicle, an automated driving specification which is determined to be possible but is not being used, or which has not been used.

Figure 2:
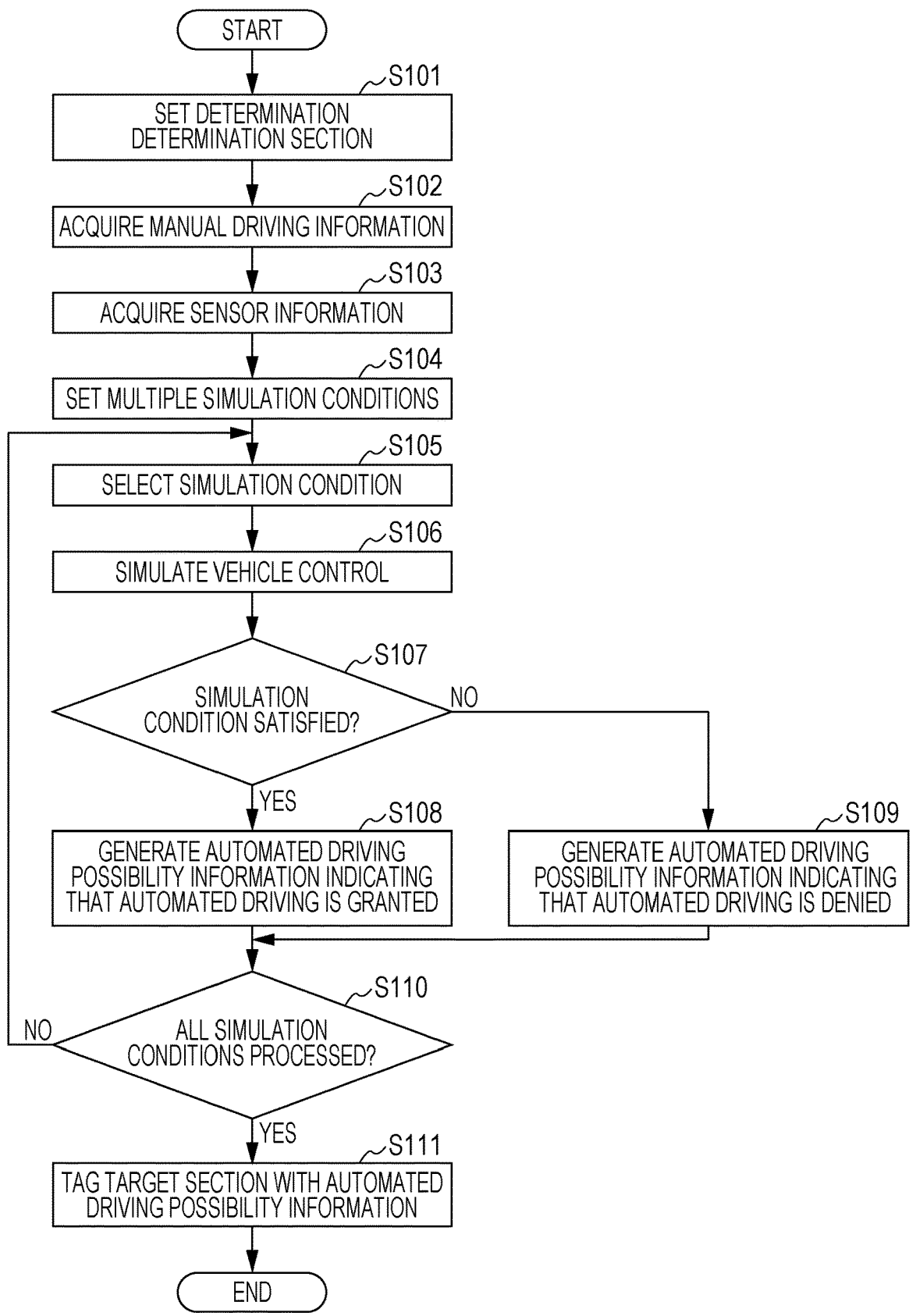
FIG. 2 is a flowchart illustrating an information processing method of the first embodiment.

The process of the information processing apparatus 100 is described below. FIG. 2 is a flowchart illustrating an information processing method of the information processing apparatus 100.

The information processing apparatus 100 sets a determination section (driving route section) that is a target section through which the possibility of the automated driving is determined (step S101). For example, a driver may now set a destination in route searching. A route section from the present position to the destination may include a section without any tag, or with a tag that the automated driving is not possible. Such a section is set to be a determination section. When the driver performs manual driving throughout the determination section, the manual driving information 111 and the sensor information 112 are generated for that determination section. The determination section may be set in any manner. For example, the driver or user may specify a determination section.

The manual driving information acquisition unit 101 acquires the manual driving information 111 of the determination section (step S102). The sensor information acquisition unit 102 acquires the sensor information 112 of the determination section (step S103). The acquisition of the information and a subsequent operation may be performed at any timing. More specifically, the information processing apparatus 100 acquires, on a real time basis, information from the vehicle that is cruising, and performs the subsequent operation on a real time basis. Alternatively, the information processing apparatus 100 may acquire information stored on the vehicle or another vehicle after driving. Alternatively, the acquired information may be stored on a memory (not illustrated) in the information processing apparatus 100, and the subsequent operation may then be performed at any timing.

The vehicle control estimation unit 103 sets multiple simulation conditions of an estimation target (specifications for the automated driving) (step S104). FIG. 3 illustrates an example of simulation conditions. Referring to FIG. 3, parameters of the simulation conditions include an algorithm for the automated driving, a frame rate that is an example of a processing rate indicating a throughput per unit time of the automated driving, a type of a sensor used in the vehicle, and a type of the automated driving. The algorithm of the automated driving is represented by a learning method and a learning scale of a discriminator used in the automated driving, and a determination rule used in the automated driving. For example, the algorithm of the automated driving may be a method in which only deep learning (DL) is used, or a method in which DL and a predetermined rule are combined. A recognition algorithm other than DL and a decision algorithm may be combined. Typically in the algorithm of the automated driving, a processing load increases as a precision level of the automated driving increases. The frame rate is represented by a frame number and indicates time intervals between which the automated driving is determined. The higher the frame rate is, the higher the precision of the automated driving is, and the higher the process load is. The type of the automated driving includes fully automated driving and partially automated driving. The type of the automated driving is not limited to discrimination between the fully automated driving and the partially automated driving. The automated driving may be discriminated in terms of type depending on the level or mode of the automated driving. For example, the level of the automated driving may indicate whether the automated driving is fully automated or partially automated. If the automated driving is the partially automated driving, the level of the automated driving indicates which control is automatically performed. The mode of the automated driving indicates contents of individual driving control or a combination of the individual driving control including automatic follow-up control or lane keep assisting.

For example, a combination of all conditions listed in FIG. 3 may be set as a simulation condition. Referring to FIG. 3, the algorithm lists three types, the frame rate lists three types, the sensor in use lists three types, the type of the automated driving lists two types. A total of 54 types of simulation conditions may be set.

Turning back to FIG. 2, the vehicle control estimation unit 103 selects one of the multiple simulation conditions as a target condition (step S105). Based on the sensor information 112 of a target section that serves as a simulation target out of the determination section, the vehicle control estimation unit 103 estimates in simulation the vehicle control for the automated driving of the vehicle under the target condition through the target section (step S106). The vehicle control estimation unit 103 then generates the automated driving information 113 indicating the estimated vehicle control for the automated driving. For example, the automated driving information 113 indicates the degree of the vehicle control, and is a vehicle control command at time intervals indicated by the frame rate, such as the steering angle of a steering wheel, the operation amount of an accelerator pedal, and the operation amount of a brake pedal.

The automated possibility determination unit 104 determines the possibility of the automated driving throughout the target section, based on the manual driving information 111 of the target section, and the automated driving information 113 of the target section. More specifically, the automated possibility determination unit 104 determines whether the manual driving information 111 and the automated driving information 113 satisfy a predetermined determination condition (step S107). This operation is described in detail below.

If the manual driving information 111 and the automated driving information 113 satisfy the determination condition (yes branch from S107), the automated possibility determination unit 104 determines that the automated driving is possible throughout the section in the target condition, and generates the automated driving possibility information 114 indicating that the automated driving is granted (step S108). If the manual driving information 111 and the automated driving information 113 do not satisfy the determination condition (no branch from S107), the automated possibility determination unit 104 determines that the automated driving is not possible throughout the target section in the target condition, and generates the automated driving possibility information 114 indicating that the automated driving is denied (step S109).

The automated possibility determination unit 104 iterates steps S105 through S109 in each simulation condition set in step S104 (step S110).

When the process is completed in all the simulation conditions (yes branch from S110), the output unit 105 tags the target section with the acquired automated driving possibility information 114 (step S111).

Referring to FIG. 4, an automated driving possibility determination process is described below. FIG. 4 illustrates an example of the automated driving possibility information 114. Referring to FIG. 4, the automated driving possibility is determined, based on each simulation condition that is a combination of the algorithm, the frame rate, the sensor in use, and the type of the automated driving (fully automated or partially automated).

The automated possibility determination unit 104 acquires computational performance information indicating computational performance of an automated driving apparatus mounted on the vehicle. Based on the acquired computational performance, the automated possibility determination unit 104 determines whether the automated driving is possible on the vehicle on each of the multiple specifications of the automated driving (in other words, the computational performance is sufficient or insufficient). If the simulation results indicate that the automated driving is possible, and if the computational performance is sufficient, the automated possibility determination unit 104 determines that the automated driving is granted on the vehicle under the simulation condition. Otherwise, the automated possibility determination unit 104 determines that the automated driving is denied under the simulation condition.

If a determination as to whether the automated driving is possible is not requested on an individual vehicle, the determination of the automated driving possibility on the individual vehicle using the computational performance may not necessarily be performed. Alternatively, a determination may be made using the computational performance on each type of vehicle or on each functionality used for a feature other than the automated driving, and then the automated driving possibility information may be generated. This is because an arithmetic unit mounted on the vehicle is different depending on the type of the vehicle, or even in the same type of vehicle, computational resources to be used for the automated driving are different depending on the functionality that is used for the feature other than the automated driving. The computational performance may thus be different.

If only the automated driving possibility is determined on a given vehicle, the information processing apparatus 100 may narrow the simulation conditions for the automated driving available on the vehicle in step S104, and performs operations in step S105 and subsequent steps on only under the narrowed simulation condition. For example, the information processing apparatus 100 may narrow the simulation conditions, based on the computational performance of the vehicle. Alternatively, automated driving specification information indicating the specification of the automated driving for the vehicle may be obtained, and the information processing apparatus 100 may narrow the simulation conditions in response to the acquired information.

A process to determine the automated driving possibility based on the manual driving information 111 and the automated driving information 113 is described in detail below.

Figures 5, 6:
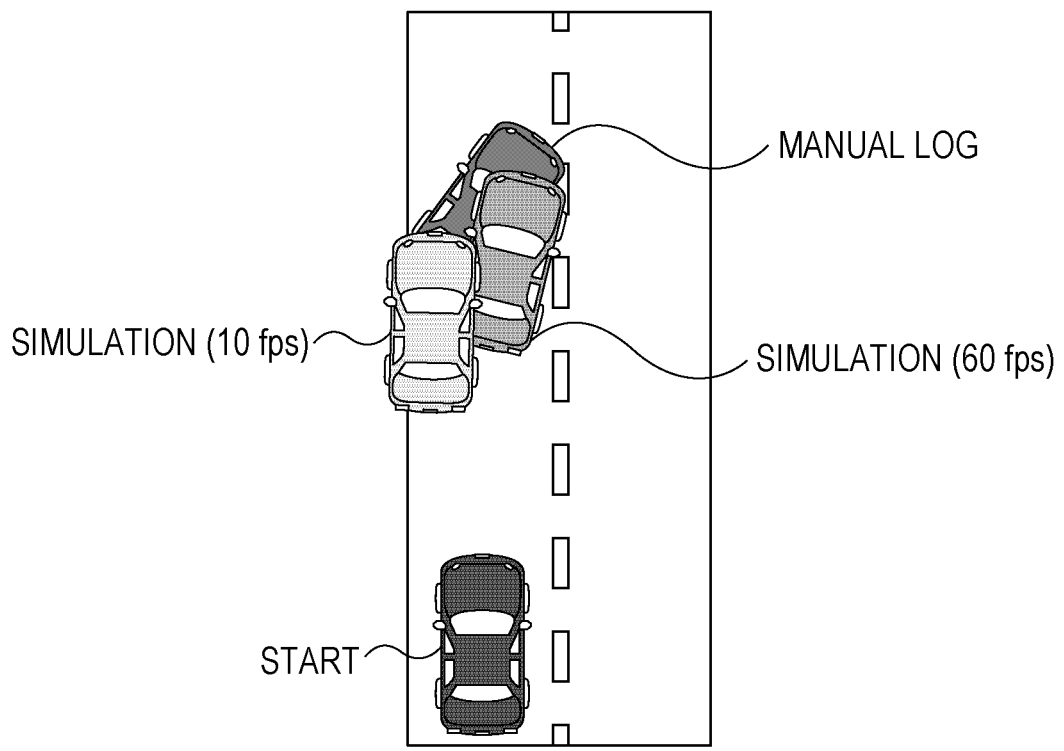
FIG. 5 illustrates an example of a manual log and a simulation value of vehicle control in accordance with the first embodiment.
FIG. 6 illustrates an example of a position and posture of a vehicle based on the manual log and the simulation value in accordance with the first embodiment.

In a first method, the automated possibility determination unit 104 determines whether the automated driving is possible, based on a correlation between the degree of the vehicle control indicated by the manual driving information 111 and the degree of the vehicle control indicated by the automated driving information 113. The automated possibility determination unit 104 then generates the automated driving possibility information 114. FIG. 5 illustrates a time change in a steering angle of a manual log indicated by the manual driving information 111 and a time change in a steering angle in the automated driving when the frame rate indicated by the automated driving information 113 is 60 fps or 10 fps. The automated possibility determination unit 104 calculates a correlation between a time change in the steering angle of the manual log and a time change in the simulation results. Similarly, on each of a brake pedal operation and an accelerator pedal operation, the automated driving possibility determination unit 104 calculates a correlation between a time change in an operation amount of the brake pedal indicated by the manual log and each of a time change in an operation amount of the brake pedal and a time change in an operation amount of the accelerator pedal in simulation results. This is not illustrated.

The automated driving possibility determination unit 104 determines the automated driving possibility, based on the correlations of the steering wheel angle, the brake pedal operation amount, and the accelerator pedal amount. For example, if a value obtained by performing a weighted average operation or a weighted addition operation on the three correlations is higher than a predetermined reference value (meaning a higher correlation), the automated driving possibility determination unit 104 determines that the automated driving is possible. Conversely, the obtained value is lower than the predetermined reference value (meaning a lower correlation), the automated driving possibility determination unit 104 determines that the automated driving is not possible. Alternatively, the automated driving possibility determination unit 104 may compare the three correlations with the same reference value or different reference values. If there is at least one correlation that is lower the reference value, the automated driving possibility determination unit 104 determines that the automated driving is not possible; otherwise, the automated driving possibility determination unit 104 determines that the automated driving is possible. Alternatively, the automated driving possibility determination unit 104 may perform the above operation during every predetermined time period. If the automated driving is possible throughout all time periods, the automated driving possibility determination unit 104 may determine that the automated driving is possible throughout the target section.

In a second method, the automated driving possibility determination unit 104 generates the automated driving possibility information 114, based on a difference between the state of the vehicle in the vehicle control indicated by the manual driving information 111 and the state of the vehicle in the vehicle control indicated by the automated driving information 113. FIG. 6 illustrates an example of a position and posture of the vehicle based on the manual log and the simulation results. More specifically, the automated driving possibility determination unit 104 estimates the position and posture of the vehicle, based on at least one piece of the information indicating the position and posture of the vehicle included in the sensor information 112 and the manual driving information 111. The automated driving possibility determination unit 104 also estimates the position and posture of the vehicle using the automated driving information 113 (simulation results).

The automated driving possibility determination unit 104 calculates a difference between two positions obtained and a difference between two postures obtained. If a value obtained by performing a weighted average operation or a weighted addition operation on the two differences obtained is lower than a predetermined reference value, the automated driving possibility determination unit 104 determines that the automated driving is possible. Conversely, if the obtained value is higher than the predetermined reference value, the automated driving possibility determination unit 104 determines that the automated driving is not possible. Alternatively, the automated driving possibility determination unit 104 may compare the positional difference and the posture difference respectively with the reference values thereof, or may compare only one of the positional difference and the posture difference with the reference value thereof for determination.

The automated driving possibility determination unit 104 performs the process in each of the predetermined time periods. If the automated driving possibility determination unit 104 determines that the automated driving is possible throughout all or some of the predetermined time periods, the automated driving possibility determination unit 104 determines that the automated driving is possible in the target section. The automated driving possibility determination unit 104 may compare the average value or addition value of multiple time periods with the reference value.

The automated driving possibility determination unit 104 may perform one of or both of the first method and the second method. For example, the automated driving possibility determination unit 104 determines that the automated driving is possible in the target section if the automated driving possibility determination unit 104 determines that the automated driving is possible in both of the first method and the second method; otherwise, the automated driving possibility determination unit 104 determines the automated driving is not possible. Alternatively, the automated driving possibility determination unit 104 may compare with a reference value a value that is obtained by performing a weighted average operation or a weighted addition operation on the correlation obtained in the first method and the difference obtained in the second method. The state of the vehicle is not limited to the position or posture of the vehicle, and may be represented in acceleration of the vehicle or an angular velocity of the vehicle in yawing, rolling, or pitching motion.

As described above, the information processing apparatus 100 determines the possibility of the automated driving in accordance with the vehicle control for the manual driving and the vehicle control for the automated driving estimated using the sensor information 112 obtained via sensing. In this way, the information processing apparatus 100 determines more precisely the possibility of the automated driving.

The algorithm, sensor, and computational performance available from the vehicle change depending on the type of vehicle and with the times. It is difficult to determine in advance the possibility of the automated driving in all the specifications of the automated driving that are determined by a combination of these factors. The information processing apparatus 100 of the first embodiment determines the possibility of the automated driving in the driving route section through which the vehicle traveled once, and stores determination results on the vehicle or server. Based on information obtained via an experience of the manual driving, the information processing apparatus 100 may determine the possibility of the automated driving in multiple specifications of the automated driving. In this way, the information processing apparatus 100 may generate map information in which the multiple specifications of the automated driving are tagged with the possibility of the automated driving.

The possibility of the automated driving is determined on each of the specifications of the automated driving. The user thus checks whether the automated driving is possible on his or her own vehicle, and then drives the vehicle. The safety of the automated driving is thus increased.

Second Embodiment

Figure 7:
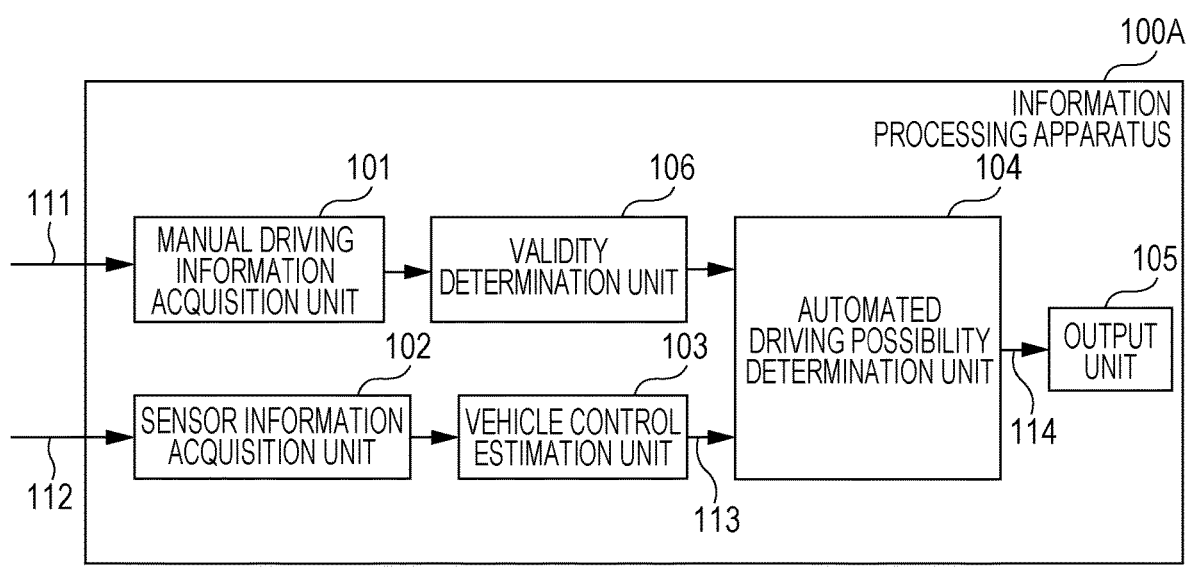
FIG. 7 is a block diagram illustrating an information processing apparatus of a second embodiment.

A modification of the first embodiment as a second embodiment is described below. FIG. 7 is a block diagram illustrating an information processing apparatus 100A of the second embodiment. The information processing apparatus 100A of FIG. 7 includes a validity determination unit 106 in addition to the elements of the information processing apparatus 100 of FIG. 1. The validity determination unit 106 acquires at least another piece of the manual driving information 111 different from the manual driving information 111 that is a process target. Based on the manual driving information 111 serving as the process target and at least another piece of the manual driving information 111, the validity determination unit 106 determines whether the manual driving information 111 serving as the process target is valid.

Figure 8:
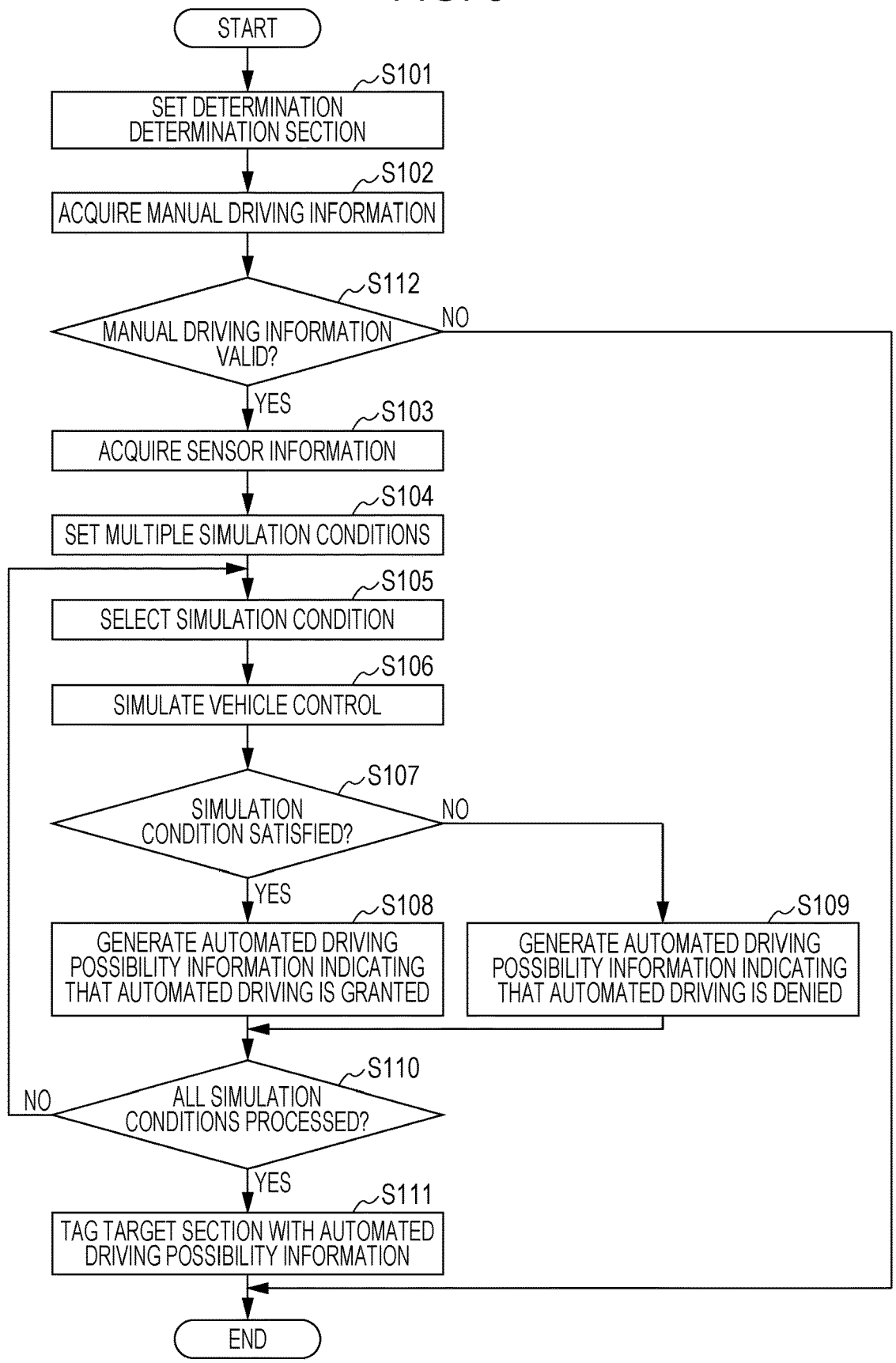
FIG. 8 is a flowchart illustrating an information processing method of the second embodiment.

FIG. 8 is a flowchart illustrating an information processing method of the information processing apparatus 100A. The process of FIG. 8 includes step S112 in addition to the process of FIG. 2.

Subsequent to step S102, the validity determination unit 106 determines whether the manual driving indicated by the manual driving information 111 serving as the process target is valid (step S112). For example, the validity determination unit 106 acquires multiple pieces of the manual driving information 111 of the target section. If a difference between an average value of the multiple pieces of the manual driving information 111 acquired and the manual driving information 111 serving as the process target is lower than a predetermined reference value, the validity determination unit 106 determines that the manual driving information 111 serving as the process target is valid; otherwise, the validity determination unit 106 determines that the manual driving information 111 serving as the process target is not valid. Alternatively, if a correlation between the average value and the manual driving information 111 serving as the process target is higher than a predetermined reference value, the validity determination unit 106 determines that the manual driving information 111 serving as the process target is valid; otherwise, the validity determination unit 106 determines that the manual driving information 111 serving as the process target is not valid.

If the manual driving indicated by the manual driving information 111 serving as the process target is valid (yes branch from step S112), the information processing apparatus 100A generates the automated driving possibility information 114 by performing operations in step S103 and subsequent steps in the same way as in the first embodiment. If the manual driving indicated by the manual driving information 111 serving as the process target is not valid (no branch from step S112), the information processing apparatus 100A ends the process.

In this way, the information processing apparatus 100A rejects inappropriate manual driving information 111, and thus controls an erroneous determination of the automated driving possibility based on the inappropriate manual driving information 111, and the tagging with the erroneous determination results.

Summary

The information processing apparatuses of the embodiments of the disclosure have been described. The disclosure is not limited to the embodiments.

In the embodiments, the information input to the vehicle control estimation unit 103 is the sensor information. Information different from the sensor information may also be input. More specifically, map information that has been used or available during the automated driving or infrastructure sensor information that has been obtained or available from infrastructure, such as a roadside machine, may be acquired from a vehicle or a server that has stored these pieces of information, and may be input to the vehicle control estimation unit 103. Using the map information or the infrastructure sensor information together with the sensor information, the vehicle control estimation unit 103 simulates the automated driving. In this way, the simulation of the automated driving is precisely performed.

Each element included in the information processing apparatuses of the embodiments is typically implemented via large scale integration (LSI), such as an integrated circuit. The elements may be individually implemented into chips, or some or all of the elements may be implemented into a single chip.

The elements are not limited to the LSI, and may be implemented by a dedicated circuit or a general-purpose processor. The elements may be implemented using a field programmable gate array (FPGA) or a reconfigurable processor. The FPGA is programmable after the manufacture of the LSI. The reconfigurable processor is reconfigurable in terms of the connection and configuration of circuit cells in the LSI.

The elements in the embodiments may be implemented using dedicated hardware or by executing a software program appropriate for each element. The elements may be implemented by a program executing unit, such as a central processing unit (CPU) or a processor, which reads and executes the software program stored on a recording medium, such as a hard disk or a semiconductor memory.

The disclosure may be embodied as an information processing method that is performed by the information processing apparatus.

The values described above have been used to specifically describe the disclosure, and the disclosure is not limited to the values described above.

The functional blocks in each block diagram are an example of partitioning of block. Multiple functional blocks may be integrated into a single block, or a single functional block may be partitioned into multiple functional blocks, or part of a functional block may be attached to another functional block. Concerning multiple functional blocks having similar functionalities, the similar functionalities may be performed by a single piece of hardware or software in parallel or in a time-division fashion.

The sequence orders of the steps to be performed in each flowchart have been used to specifically describe the disclosure, and a different sequence order is acceptable. Some steps may be performed concurrently with (in parallel with) another step.

One or more information processing apparatuses and information processing methods have been described with reference to the embodiments. The disclosure is not limited to the embodiments. It will be apparent to those skilled in the art that various changes and modifications can be made herein in the embodiments and the elements in the embodiments can be combined herein without departing from the scope of the disclosure.

The disclosure finds applications in a vehicle having an automated driving functionality, a server controlling or managing the vehicle, or a system including the vehicle and the server.

What is claimed is:

1. An information processing method comprising:
acquiring, from a device mounted on a vehicle, manual driving information indicating vehicle control for manual driving of the vehicle through a driving route section;
acquiring, sensor information from the device mounted on the vehicle, the sensor information being acquired via sensing on the vehicle during the manual driving through the driving route section;
generating automated driving information indicating vehicle control for automated driving of the vehicle through the driving route section, based on the sensor information; and
generating automated driving possibility information indicating whether the automated driving through the driving route section is possible or not, based on the manual driving information and the automated driving information,
wherein the generating of the automated driving possibility information comprises generating the automated driving possibility information, based on comparison results of the manual driving information with the automated driving information, and
wherein the automated driving information is generated based on the sensor information acquired during same time period and through same driving route as the manual driving information.

2. The information processing method according to claim 1, further comprising:
acquiring, from a device mounted on at least another vehicle different from the vehicle, at least a piece of manual driving information different from the manual driving information; and
based on the manual driving information and the at least the piece of the manual driving information, determining whether the manual driving information is valid,
wherein the generating of the automated driving possibility information includes generating the automated driving possibility information when the manual driving information is determined to be valid.

3. The information processing method according to claim 1, wherein the generating automated driving possibility information includes generating driving possibility information for different levels of automated driving.

4. The information processing method according to claim 1, wherein the generating automated driving possibility information includes generating partial granting of automated driving and partial denial of automated driving.

5. The information processing method according to claim 1, wherein the generating automated driving possibility information is based on computing capability of the vehicle for performing the automated driving through the driving route section that is driven by the manual driving.

6. The information processing method according to claim 1, wherein the generating of the automated driving information comprises generating the automated driving information indicating the vehicle control for the automated driving responsive to a specification of the automated driving.

7. The information processing method according to claim 6, further comprising acquiring, from an external apparatus including the device mounted on the vehicle or a memory in a computer, automated driving specification information indicating the specification of the automated driving of the vehicle,
wherein the generating of the automated driving information includes generating the automated driving information indicating the vehicle control for the automated driving responsive to the specification of the automated driving indicated by the automated driving specification information.

8. The information processing method according to claim 6, wherein the generating of the automated driving information comprises generating a plurality of pieces of automated driving information respectively indicating the vehicle control for the automated driving on each of a plurality of specifications of the automated driving, and
wherein the generating of the automated driving possibility information comprises generating a plurality of pieces of the automated driving possibility information on each of the specifications of the automated driving, based on the manual driving information and the pieces of the automated driving information.

9. The information processing method according to claim 6, wherein the specification of the automated driving comprises an algorithm for the automated driving.

10. The information processing method according to claim 6, wherein the specification of the automated driving comprise a processing rate of the automated driving, the processing rate indicating a throughput per unit time of the automated driving.

11. The information processing method according to claim 6, wherein the specification of the automated driving comprises a type of a sensor for use in the automated driving.

12. The information processing method according to claim 6, wherein the specification of the automated driving comprises a level or contents of the automated driving.

13. The information processing method according to claim 6, further comprising acquiring, from an external apparatus including the device mounted on the vehicle or a memory in a computer, computational performance information indicating computational performance of the vehicle,
wherein the generating of the automated driving possibility information includes generating the automated driving possibility information, based on results of a determination that is performed in accordance with the computational performance indicated by the computational performance information and that indicates whether the automated driving is possible on the vehicle, and based on the manual driving information, and the automated driving information.

14. The information processing method according to claim 1, wherein each piece of the manual driving information and the automated driving information comprises a degree of the vehicle control, and
wherein the generating of the automated driving possibility information includes (i) generating the automated driving possibility information which indicates the automated driving through the driving route section is possible when a value of a correlation between the degree of the vehicle control indicated by the manual driving information and the degree of the vehicle control indicated by the automated driving information is larger than or equal to a predetermined value, and (ii) generating the automated driving possibility information which indicates the automated driving through the driving route section is not possible when the value of the correlation is smaller than the predetermined value.

15. The information processing method according to claim 14,
wherein the degree of the vehicle control indicated by the manual driving information includes, in the manual driving, a manual steering angle of a steering wheel, a manual operation amount of an accelerator pedal, and a manual operation amount of a brake pedal,
wherein the degree of the vehicle control indicated by the automated driving information includes, in the automated driving, an automated steering angle of the steering wheel, an automated operation amount of the accelerator pedal, and an automated operation amount of the brake pedal, and
wherein the value of correlation includes a first value of correlation between the manual steering angle of the steering wheel and the automated steering angle of the steering wheel, a second value of correlation between the manual operation amount of the accelerator pedal and the automated operation amount of the accelerator pedal and a third value of correlation between the manual operation amount of the brake pedal and the automated operation amount of the brake pedal.

16. The information processing method according to claim 15,
wherein the automated driving possibility information indicates that the automated driving through the driving route section is not possible when one of the first value of the correlation, the second value of the correlation and the third value of the correlation is smaller than the predetermined value.

17. The information processing method according to claim 1, wherein the generating of the automated driving possibility information comprises (i) generating the automated driving possibility information which indicates the automated driving through the driving route section is possible when a value of a difference between a state of the vehicle responsive to the vehicle control indicated by the manual driving information and a state of the vehicle responsive to the vehicle control indicated by the automated driving information is smaller than a predetermined value and (ii) generating the automated driving possibility information which indicates the automated driving through the driving route section is not possible when the value of the difference is larger than or equal to the predetermined value.

18. The information processing method according to claim 17, wherein the state of the vehicle comprises at least one of a position and a posture of the vehicle.

19. An information processing apparatus comprising:
a processor; and
a memory storing thereon a computer program, which when executed by the processor, causes the processor to perform operations including:
acquiring, from a device mounted on a vehicle, manual driving information indicating vehicle control for manual driving of the vehicle through a driving route section;
acquiring, sensor information from a device mounted on the vehicle, the sensor information being acquired via sensing on the vehicle during the manual driving through the driving route section;
generating automated driving information indicating vehicle control for automated driving of the vehicle through the driving route section, based on the sensor information; and
generating automated driving possibility information indicating whether the automated driving through the driving route section is possible or not, based on the manual driving information and the automated driving information,
wherein the generating of the automated driving possibility information comprises generating the automated driving possibility information, based on comparison results of the manual driving information with the automated driving information, and
wherein the automated driving information is generated based on the sensor information acquired during same time period and through same driving route as the manual driving information.

* * * * *